US010798868B2

(12) United States Patent
Limaye et al.

(10) Patent No.: US 10,798,868 B2
(45) Date of Patent: Oct. 13, 2020

(54) COMPACT HINGE ASSEMBLY FOR FLOATING AND FOLDING FRAME SECTIONS

(71) Applicant: DEERE & COMPANY, Moline, IL (US)

(72) Inventors: Padmanabh Limaye, Pune, MH (IN); Trond A. Svidal, Crestwood, KY (US)

(73) Assignee: DEERE & COMPANY, Moline, IL (US)

( * ) Notice: Subject to any disclaimer, the term of this patent is extended or adjusted under 35 U.S.C. 154(b) by 169 days.

(21) Appl. No.: 15/998,703

(22) Filed: Aug. 15, 2018

(65) Prior Publication Data
US 2020/0053950 A1     Feb. 20, 2020

(51) Int. Cl.
*A01B 73/04*    (2006.01)
*A01C 5/06*     (2006.01)
*A01C 7/08*     (2006.01)

(52) U.S. Cl.
CPC .......... *A01B 73/044* (2013.01); *A01C 5/062* (2013.01); *A01C 7/081* (2013.01)

(58) Field of Classification Search
CPC .................................................. A01B 73/044
(Continued)

(56) References Cited

U.S. PATENT DOCUMENTS 3,797,580 A * 3/1974 Roth ....................... A01B 73/04
                                                              172/311
4,047,575 A * 9/1977 Wagner ................ A01B 73/044
                                                              172/311
(Continued)

FOREIGN PATENT DOCUMENTS

AU          1794383         2/1984
BR     102013026745 A2      8/2015
(Continued)

OTHER PUBLICATIONS

ScienceDirect, Mechanism and Machine Theory 43, 1585-1595, Classification and type synthesis of 1-DOF remote center of motion mechanics, Guanghua Zong, Xu Pei, Jingjun Yu & Shusheng Bi, 2008.

(Continued)

*Primary Examiner* — Thomas B Will
*Assistant Examiner* — Joel F. Mitchell
(74) *Attorney, Agent, or Firm* — Klintworth & Rozenblat IP LLP

(57) ABSTRACT

A hinge assembly for pivotally connecting a first frame section and a second frame section includes at least one pivot plate pivotally connected to the first mounting structure of the first frame section with a first pin and pivotally connected to the first mounting structure of the second frame section with a second pin. The hinge assembly further includes a linkage bar with a first end pivotally connected to the second mounting structure of the first frame section with a third pin and a second end pivotally connected to the second mounting structure of the second frame section with a fourth pin. The pivot plate and the linkage bar are configured such that the second frame section pivots about the fourth pin during a working state and about the third pin during a transition between the working state and a folding state.

18 Claims, 5 Drawing Sheets

(58) Field of Classification Search
USPC .......................................... 172/311, 456, 666
See application file for complete search history.

(56) References Cited

U.S. PATENT DOCUMENTS

| | | | | |
|---|---|---|---|---|
| 4,050,523 A | * | 9/1977 | Poland | A01B 73/044 |
| | | | | 172/311 |
| 4,178,998 A | | 12/1979 | Rockwell | |
| 4,415,043 A | * | 11/1983 | Hadler et al. | A01B 73/044 |
| | | | | 172/311 |
| 4,615,397 A | | 10/1986 | Hastings | |
| 4,862,758 A | * | 9/1989 | Magee | A01B 73/044 |
| | | | | 74/103 |
| 4,878,545 A | * | 11/1989 | Dyken | A01B 73/04 |
| | | | | 172/776 |
| 5,944,116 A | * | 8/1999 | Domries | A01B 63/26 |
| | | | | 172/580 |
| 6,761,228 B2 | * | 7/2004 | Dobson et al. | A01B 73/04 |
| | | | | 111/54 |
| 8,468,655 B2 | | 6/2013 | Borkgren et al. | |
| 2011/0258811 A1 | | 10/2011 | Borkgren et al. | |

FOREIGN PATENT DOCUMENTS

| | | |
|---|---|---|
| EP | 1500322 | 1/2005 |
| EP | 2380423 | 10/2011 |

OTHER PUBLICATIONS

Extended European Search Report issued in European Patent Application No. 19185877.8 dated Dec. 18, 2019 (8 pages).

\* cited by examiner

COMPACT HINGE ASSEMBLY FOR FLOATING AND FOLDING FRAME SECTIONS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a hinge assembly defining multiple pivot axes, and in particular, to a hinge assembly used in a frame of an agricultural implement to fold an outer wing frame section relative to an adjacent frame section when in a storage or transport state and also to provide for floating of the outer wing frame section relative to the adjacent frame section when in a working state to accommodate ground contours.

BACKGROUND OF THE DISCLOSURE

Agricultural producers, like other producers, are constantly seeking to increase productivity. One way to increase machine productivity is to increase the width of the machine. However, increasing the width presents challenges for maintaining proper operation, particularly while also enabling convenient transport and storage configurations. In the case of an air seeder drill, some approaches involve multi-section frames, as such attaching inner and outer wing frame sections to a center frame section in a manner that enables the folding of the outer wing frame section for transport and the floating of the outer wing frame section when working. The associated hinge assemblies between frame sections attempt to enable each of these functions without sacrificing performance or customer satisfaction, which may be challenging.

SUMMARY OF THE DISCLOSURE

The disclosure provides a hinge assembly with multiple pivot points that enable different pivot axes or centers of rotation for a working state and a folding state.

In an aspect, the disclosure provides a hinge assembly for pivotally connecting a first frame section and a second frame section of a frame, each of the first and second frame sections having a first mounting structure and a second mounting structure. The hinge assembly includes at least one pivot plate pivotally connected to the first mounting structure of the first frame section with a first pin and pivotally connected to the first mounting structure of the second frame section with a second pin. The at least one pivot plate defines a slot configured to be coupled to an actuator with a floating pin. The hinge assembly further includes a linkage bar with a first end pivotally connected to the second mounting structure of the first frame section with a third pin and a second end pivotally connected to the second mounting structure of the second frame section with a fourth pin. The at least one pivot plate and the linkage rod are configured such that the second frame section pivots about the fourth pin during a working state and about the third pin during a transition between the working state and a folding state.

In another aspect, the disclosure further provides an implement frame with a first frame section having a first mounting structure and a second mounting structure; a second frame section having a first mounting structure and a second mounting structure; an actuator with a first end and a second end, the first end being coupled to the first frame section; and a hinge assembly pivotally connecting the first frame section and the second frame section. The hinge assembly includes at least one pivot plate pivotally connected to the first mounting structure of the first frame section with a first pin and pivotally connected to the first mounting structure of the second frame section with a second pin, the at least one pivot plate defining a slot coupled to the second end of the actuator with a floating pin. The hinge assembly further includes a linkage bar with a first end pivotally connected to the second mounting structure of the first frame section with a third pin and a second end pivotally connected to the second mounting structure of the second frame section with a fourth pin. The at least one pivot plate and the linkage rod are configured such that the second frame section pivots about the fourth pin during a working state and about the third pin during a transition between the working state and a folding state.

The details of one or more embodiments are set forth in the accompanying drawings and the description below. Other features and advantages will become apparent from the description, the drawings, and the claims.

DETAILED DESCRIPTION

The following describes one or more example implementations of a disclosed hinge assembly for a work vehicle or machine implement as shown in the accompanying figures of the drawings described briefly above. Various examples herein refer to the context of the hinge assembly in an air seeder drill. It will be understood, however, that the disclosed embodiments may be utilized in a variety of work machine or work vehicle implements. Various modifications to the example embodiments may be contemplated by one of skill in the art.

Generally, the disclosed hinge assemblies (and work implements in which they are incorporated) couple together inner and outer wing frame sections to provide for multiple pivot points that cooperate to provide a first instantaneous center of rotation during a working state that allows the outer wing frame section to float and a second instantaneous center of rotation during a folding state that allows the outer wing frame section to be folded over the inner wing frame section. This configuration provides advantages for both states, while reducing complexity, component count, and hinge assembly size.

Figure 1:
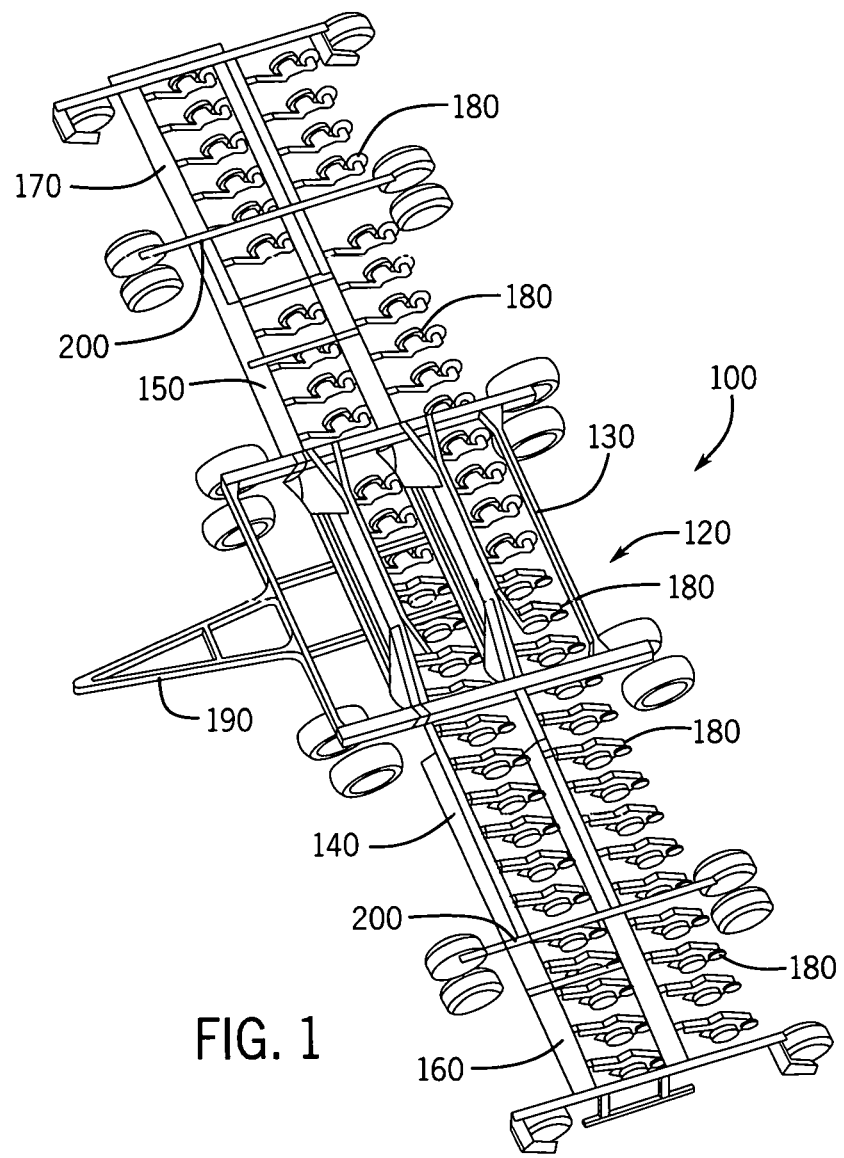
FIG. 1 is an isometric view of an example work machine implement in the form of an air seeder drill in which one or more of the disclosed hinge assemblies may be used.
Figure 8:
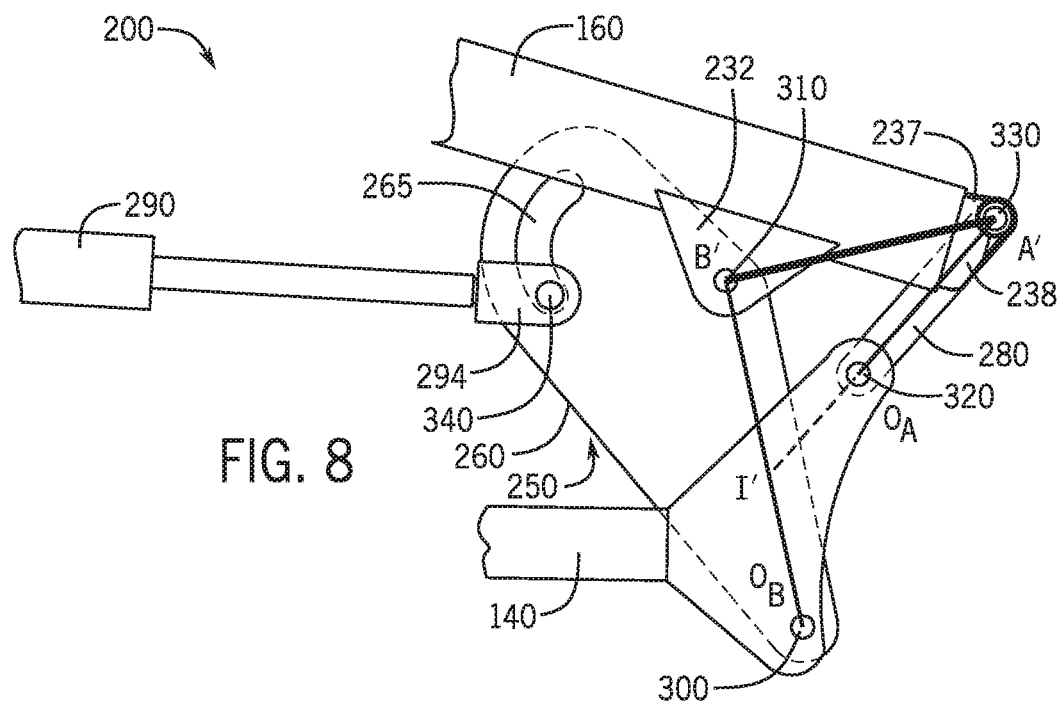
FIG. 8 is a cross-sectional side view of the hinge assembly of FIG. 2 in the folding state according to an embodiment.

With reference to FIG. 1, a work implement in the form of an air seeder drill 100 is shown having hinge assemblies 200 connecting one or more adjacent frame sections. The air seeder drill 100 has a frame 120 that includes a tongue 190 used to couple the air seeder drill 100 to a tractor or other prime mover. In this example, the frame 120 includes five sections: a center frame section 130, two inner wing frame sections 140, 150 and two outer wing frame sections 160, 170. The outer wing frame sections 160, 170 are respectively coupled to the inner wing frame sections 140, 150 by hinge assemblies 200 to enable each outer wing frame section 160, 170 to float relative to the adjacent inner wing frame section 140, 150 in the working state shown in FIG. 1 and folding relative to the inner wing frame sections 140, 150 during the folding state, such as shown in FIG. 8. In some examples, each inner wing frame section 140, 150 may also be coupled to the center frame section 130 by the hinge assemblies 200 to enable the inner wing frame sections 140, 150 to perform similar functions with respect to the center frame section 130. Other frame configurations may be provided, including two or three frame section arrangements. Generally, the hinge assemblies 200 described herein may couple any two adjacent frame sections to one another.

Each of the five frame sections 130, 140, 150, 160, 170 support a number of ground engaging tools, in this case, furrow openers 180 to open a furrow into which seed is deposited and then closed. The furrow openers 180 extend downwardly from the respective frame section 130, 140, 150, 160, 170 to engage the ground when in the working state. Other types of ground engaging tools may be used with the frame such as tillage tools or fertilizer applicators. The hinge assemblies 200 are not limited by the type of ground engaging tool and/or implement type.

Figure 2:
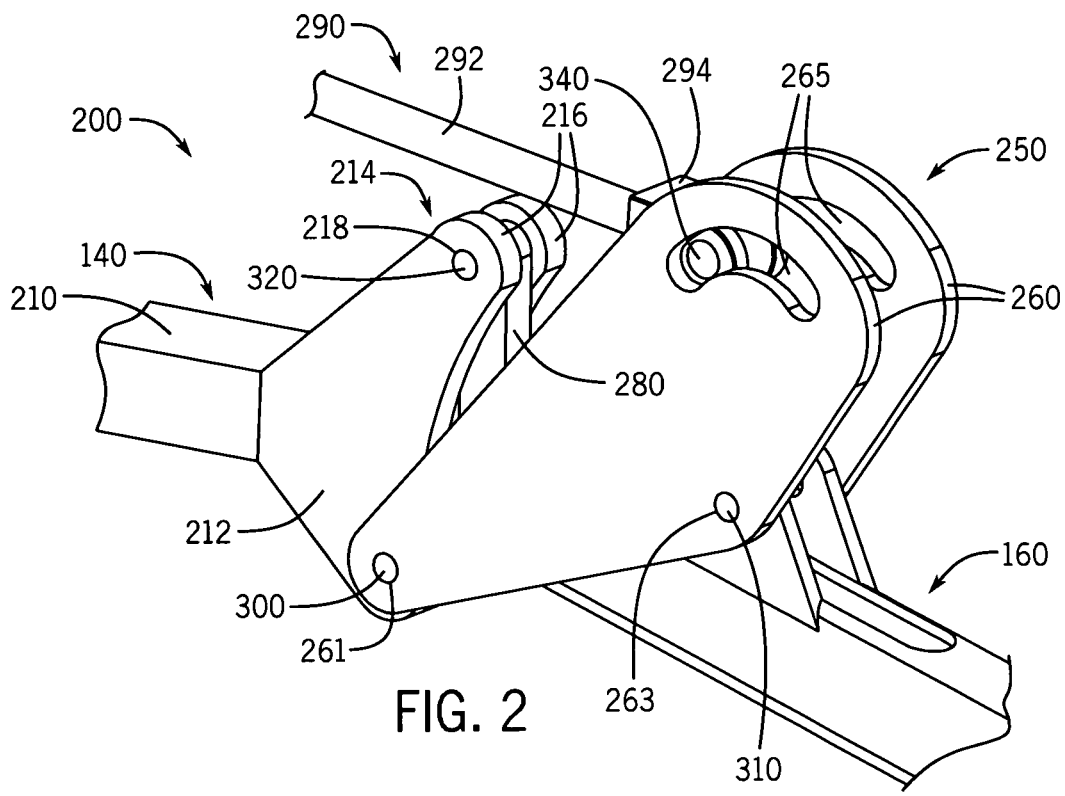
FIG. 2 is a first isometric view of a hinge assembly that may be implemented in an air seeder drill according to an embodiment.

The hinge assemblies 200 that couple the outer wing frame sections 160, 170 to the inner wing frame sections 140, 150 are discussed in greater detail below with reference to FIGS. 2-9. Reference is initially made to FIG. 2, which is a first isometric view of one of the hinge assemblies 200, particularly the hinge assembly 200 that couples the outer wing frame section 160 to the inner wing frame section 140, although the hinge assembly 200 described below may be representative of a hinge assembly 200 that couples any of adjacent frames to one another (e.g., section 170 to section 150, or sections 140, 150 to section 130).

As described in greater detail below, the hinge assembly 200 may have multiple pivot points that cooperate to provide multiple centers of rotation for operation in various positions and states, including a working state in which the associated furrow openers 180 (FIG. 1) are engaging the ground and a folding state in which the outer wing frame section 160 is folded over the inner wing frame section 140 for transport. In the view of FIG. 2, the hinge assembly 200 is in the working state.

In FIG. 2, the inner wing frame section 140 and outer wing frame section 160 are only partially depicted. As shown, the inner wing frame section 140 includes a tube or bar member 210 with an inner wing lower mounting structure 212 and an inner wing upper mounting structure 214 positioned approximately at an end of the inner wing tube 210. In this example, the inner wing lower mounting structure 212 is a generally solid structure extending outward and below the tube 210 and defining a through hole 213 (FIG. 3) forming a first connection point for the inner wing frame section 140. The inner wing upper mounting structure 214 includes two upwardly extending flanges 216 above and slightly beyond the end of the tube 210 with aligned holes 218 that collectively form a second connection point for the inner wing frame section 140.

Figure 3:
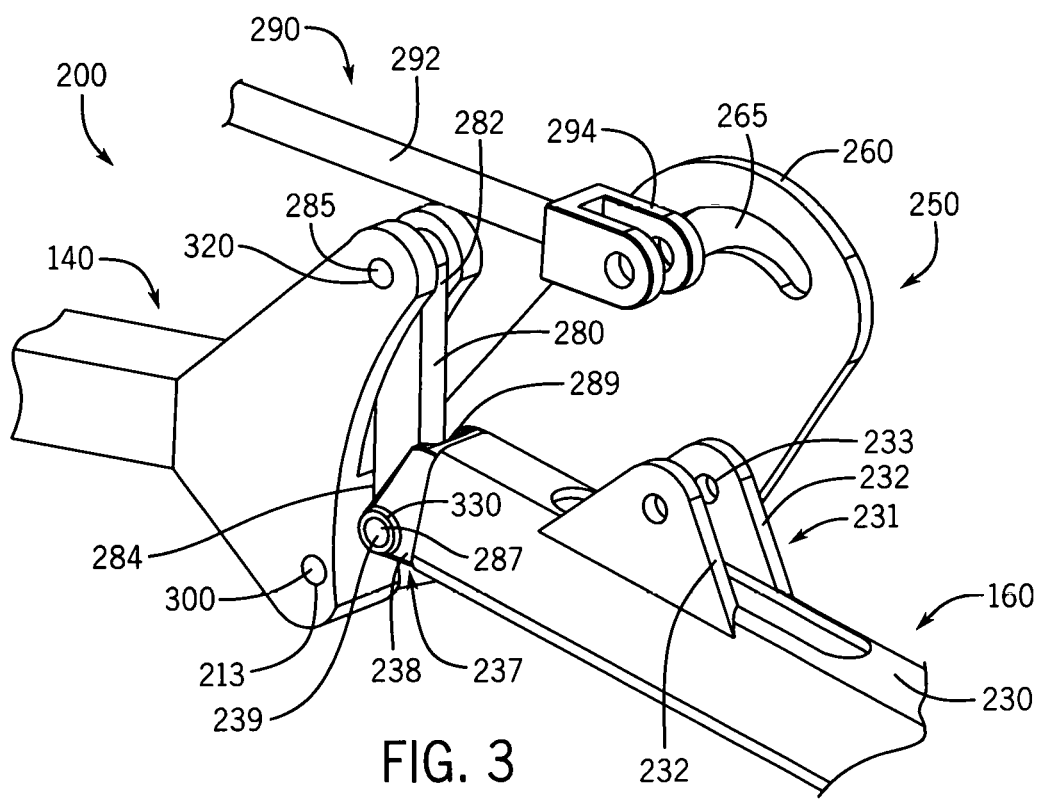
FIG. 3 is a further isometric view of the hinge assembly of FIG. 2 according to an embodiment.

Aspects of the outer wing frame section 160 are more clearly depicted by FIG. 3, which is a view corresponding to that of FIG. 2 with portions of the hinge assembly 200 removed for clarity. The outer wing frame section 160 includes a tube or bar member 230 with an outer wing top mounting structure 231 positioned on an upper surface of the tube 230 and an outer wing end mounting structure 237 positioned on the end of the tube 230. The outer wing top mounting structure 231 is formed by parallel outer wing mounting flanges 232 positioned at an interior distance from the end of the tube 230, and each defines aligned holes 233 that collectively define a first connection point for the outer wing frame section 160. The outer wing end mounting structure 237 is formed by longitudinally extending members 238 (one of which is shown) with aligned holes 239 (one of which is shown) that collectively form a second connection point for the outer wing frame section 160.

The hinge assembly 200 includes a rockshaft assembly 250, which in this example, is formed by first and second pivot plates 260 arranged parallel to one another. The pivot plates 260 are generally identical, and each includes a first hole 261, a second hole 263, and a slot 265. The pivot plates 260 are arranged such that the respective first holes 261 are aligned to form a first connection point; the respective second holes 263 are aligned to form a second connection point; and respective slots 265 are aligned to form a third or floating connection point. In this example, each pivot plate 260 is generally triangular with the first hole 261 on the lower portion, the second hole 263 on the outer portion, and the slot 265 along the upper portion.

The hinge assembly 200 further includes a linkage bar 280 with first and second ends 282, 284, each having a hole 285, 287 (obscured in FIG. 3) that respectively forms first and second connection points for the linkage bar 280. The linkage bar 280 generally has an elongated straight or rectangular shape.

The hinge assembly 200 may include or otherwise interact with an actuator 290. The actuator 290 may be formed by a rod 292 that is partially housed in a cylinder (not shown) such that adjusting the fluid pressure in the cylinder extends and retracts the rod 292. The cylinder may be coupled (not shown) to the inner wing frame section 140 or other structure of the frame 120. As shown in FIG. 3, the rod 292 may have an actuator coupling member 294 at a distal end that is coupled to the rockshaft assembly 250 as described below. In one example, the actuator coupling member 294 may be a clevis structure.

The structural interconnections of the hinge assembly 200 will now be described prior to a more detailed description of operation.

To join the inner wing frame section 140 to the rockshaft assembly 250, a first pin 300 extends through the holes 261 on the pivot plates 260 and through the hole 213 on the inner wing lower mounting structure 212. As such, the first pin 300 couples the first connection point of the rockshaft assembly 250 to the second connection point of the inner wing frame section 140. In this manner, the inner wing frame section 140 and the rockshaft assembly 250 may pivot relative to one another. In the context of the overall hinge assembly 200, the first pin 300 may represent a first pivot point.

To join the outer wing frame section 160 to the rockshaft assembly 250, a second pin 310 extends through the holes 263 on the pivot plates 260 and through the holes 233 of the outer wing mounting flanges 232. As such, the second pin 310 couples the second connection point of the rockshaft assembly 250 to the first connection point of the outer wing frame section 160. In this manner, the outer wing frame section 160 and the rockshaft assembly 250 may pivot relative to one another. In the context of the overall hinge assembly 200, the second pin 310 may represent a second pivot point.

The linkage bar 280 is pivotally coupled both the inner wing frame section 140 and the outer wing frame section 160. In particular, a third pin 320 extends through the holes 218 of the inner wing upper mounting structure 214 and through the hole 285 at the first end 282 of the linkage bar 280 to couple the first connection point of the inner wing frame section 140 and the first connection point of the linkage bar 280. In effect, the first end 282 of the linkage bar 280 is captured between the flanges 216 of the inner wing upper mounting structure 214 to enable pivoting movement of the linkage bar 280 relative to the inner wing frame section 140. In the context of the overall hinge assembly 200, the third pin 320 may represent a third pivot point.

A fourth pin 330 extends through the holes 239 of the members 238 of the outer wing end mounting structure 237 and through the hole 287 at the second end 284 of the linkage bar 280 to couple the second connection point of the outer wing frame section 160 and the second connection point of the linkage bar 280. In effect, the second end 284 of the linkage bar 280 is captured between the longitudinally extending members 238 of the outer wing end mounting structure 237 to enable relative pivoting movement of the linkage bar 280 and the outer wing frame section 160. In the context of the overall hinge assembly 200, the fourth pin 330 may represent a fourth pivot point. As described in greater detail below, the upper pivot angle between the linkage bar 280 and the outer wing frame section 160 may be limited by an end stop 289 on the end of the outer wing frame section 160 formed between the members 238 of the outer wing end mounting structure 237.

As noted above, the actuator 290 is also pivotally connected to the rockshaft assembly 250. In particular, a fifth pin 340 extends through the actuator coupling member 294 such that the ends are arranged within each of the slots 265 of the pivot plates 260 to form a floating connection point. As described below, the slots 265 enable some relative pivoting movement (also referred to as floating or flexing) of the rockshaft assembly 250 relative to the actuator 290 that is defined by the length of the slots 265, while limiting floating as the fifth pin 340 engages one of the ends of the slots 265. The slots 265 also enable the actuator 290 to act on the rockshaft assembly 250 by engaging the inner end of the slots 265 and pulling the pivot plates 260, as described below.

Operation of the hinge assembly 200 will now be described with reference to FIGS. 4-8, which are side views of the hinge assembly 200 with one of the pivot plates 260 removed for clarity. As introduced above, the hinge assembly 200 may be considered to have two states: a working state in which the air seeder drill 100 (FIG. 1) is being pulled along the ground, such as during a seeding application; and a folding state in which at least the outer wing frame sections 160, 170 are folded relative to the inner wing frame sections 140, 150 (FIG. 1), such as during transport or storage of the air seeder drill 100. In order to advantageously enable these states, the hinge assembly 200 provides multiple pivot points that cooperate to result in a different instantaneous center of rotation (or effective pivot axis) for each state, as described above.

Figure 4:
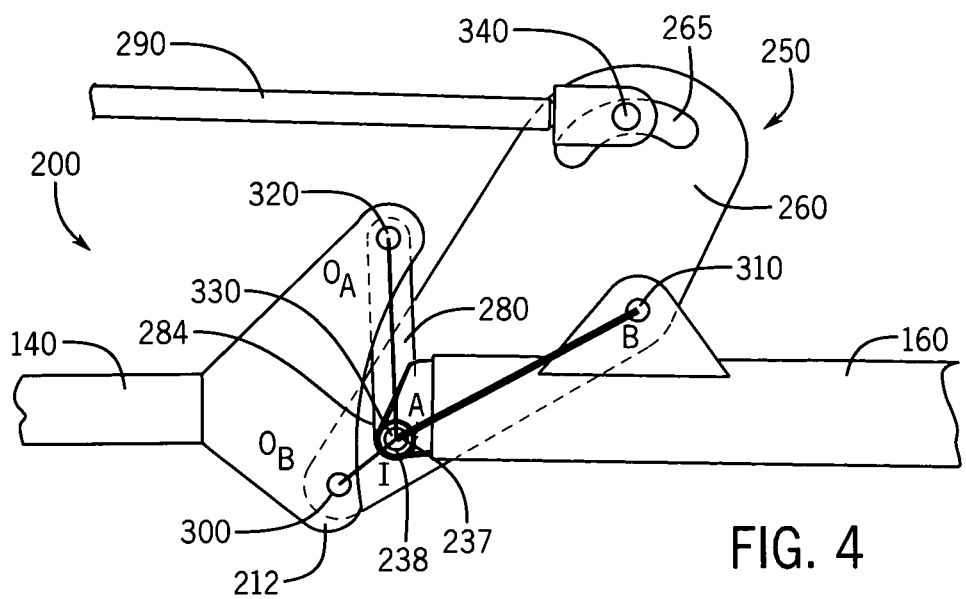
FIG. 4 is a cross-sectional side view of the hinge assembly of FIG. 2 in a first position of a working state according to an embodiment.
Figure 5:
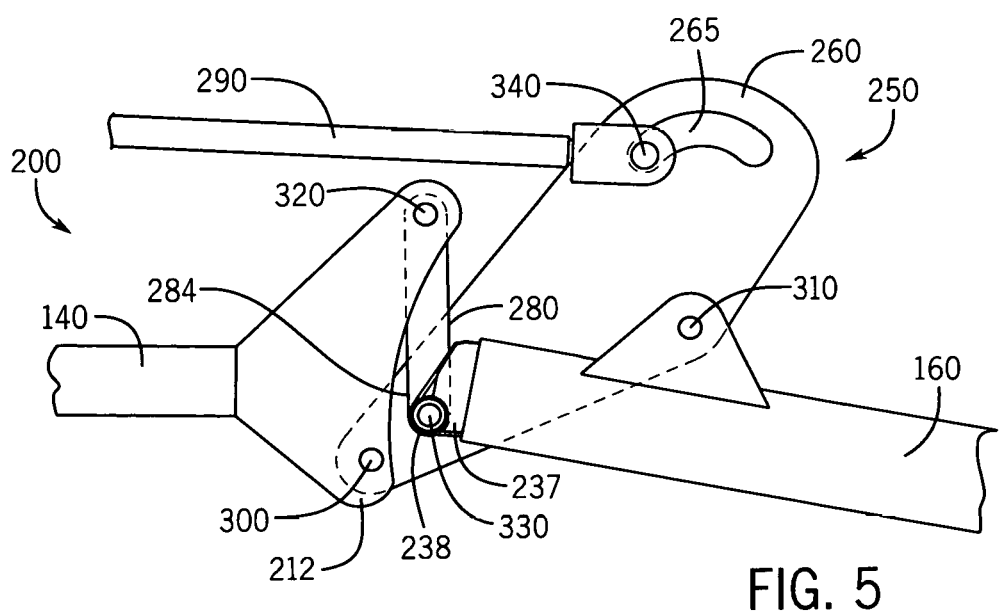
FIG. 5 is a cross-sectional side view of the hinge assembly of FIG. 2 in a second position of the working state according to an embodiment.
Figure 6:
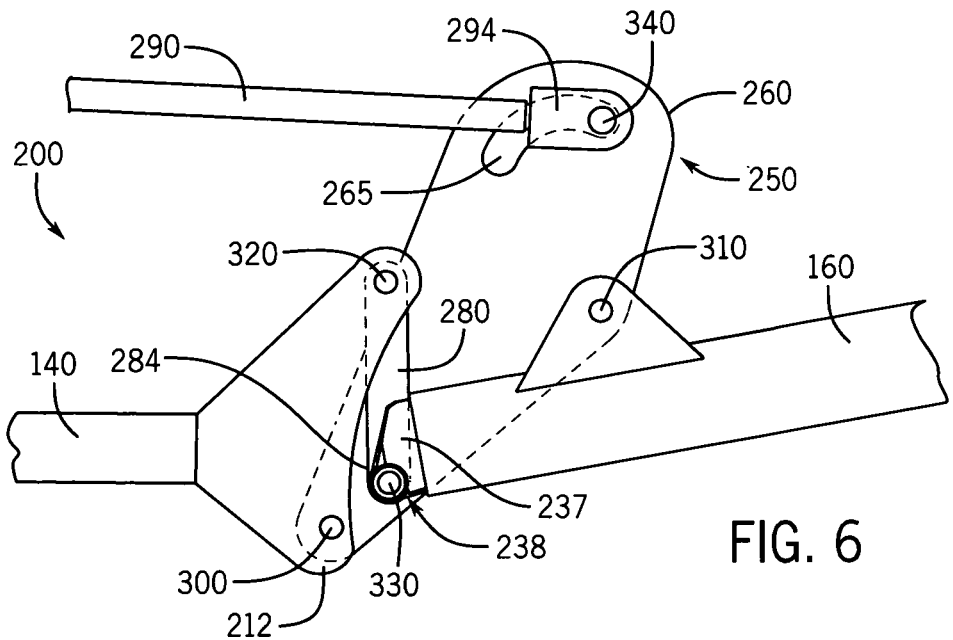
FIG. 6 is a cross-sectional side view of the hinge assembly of FIG. 2 in a third position of the working state according to an embodiment.

Reference is made to FIGS. 4-6, which depict the hinge assembly 200 in different positions of the working state in which the outer wing frame section 160 is allowed to pivot or float about the fourth pin 330 to move up and down, e.g., as the section 160 follows a ground contour. In FIG. 4, the outer wing frame section 160 is generally aligned relative to the inner wing frame section 140 in a horizontal position. This corresponds to a position in which the wheels of the outer wing frame section 160 are on terrain that is generally at the same level as the inner wing frame section 140. By comparison, in FIG. 5, the outer wing frame section 160 is pivoted downward, such as would be the case when the wheels of the outer wing frame section 160 engage terrain at a lower level than the inner wing frame section 140. As such, the position in FIG. 4 may be considered a horizontal position, and the position of FIG. 5 may be considered a downwardly flexed position.

During a transition from the horizontal position of FIG. 4 into the downwardly flexed position of FIG. 5, the outer wing frame section 160 primarily pivots about the fourth pivot point defined by the fourth pin 330 at the second connection point of members 238 of the outer wing end mounting structure 237 and the second connection point of the second end 284 of the linkage bar 280. In particular, as the outer wing frame section 160 is pulled downward, the end of the outer wing frame section 160 pivots about the fourth pin 330 relative to the linkage bar 280, and thus, relative to the inner wing frame section 140. Additionally, since the outer wing frame section 160 is also connected to the rockshaft assembly 250, the downward movement of the outer wing frame section 160 pulls the rockshaft assembly 250 downward and pivots the rockshaft assembly 250 relative to the inner wing frame section 140. In particular, downward force from the outer wing frame section 160 at the first connection point on the pivot plates 260 via the second pin 310 results in the rockshaft assembly 250 pivoting about the first pin 300 extending through the first connection point on the pivot plates 260 and the second connection point on the inner wing lower mounting structure 212 of the inner wing frame section 140. During this movement, the actuator 290 is generally stationary as the rockshaft assembly 250 pivots. The slots 265 in the rockshaft assembly 250 enable movement between the rockshaft assembly 250 and the actuator 290 to an extent defined by the lengths of the slots 265. In other words, the lengths of the slots 265 define the amount of travel permitted of the outer wing frame section 160 resulting from elevation changes in the terrain.

As shown in FIG. 5, the outer wing frame section 160 may flex downward, pulling the rockshaft assembly 250 downward as well, until the inner ends of the slots 265 of the rockshaft assembly 250 reach the position of the fifth pin 340 and actuator coupling member 294. As this position, the fifth pin 340, and thus actuator coupling member 294, engages the rockshaft assembly 250, and the resistance force provided by the actuator 290 prevents further downward movement of the rockshaft assembly 250, as well as outer wing frame section 160 coupled to the rockshaft assembly 250 at the second pin 310. This limits the downward extent of floating of the outer frame section 160 relative to the inner wing frame section 140. In some examples, a pneumatic pressure may be maintained within the actuator 290 in order to prevent movement of the actuator 290 and rockshaft assembly 250 during engagement to provide the appropriate resistance.

The outer wing frame section 160 may also be upwardly flexed relative to the inner wing frame section 140, such as when traveling over terrain that is higher than the terrain underneath the inner wing frame section 140. The upwardly flexed position is depicted in FIG. 6. The transition from horizontal to the upwardly flexed position is similar to the transition to the downwardly flexed position described above. For example, during the transition from the horizontal position of FIG. 4 into the upwardly flexed position of FIG. 6, the outer wing frame section 160 primarily pivots about the fourth pivot point defined by the fourth pin 330 at the second connection point of members 238 of the outer wing end mounting structure 237 and the second connection point of the second end 284 of the linkage bar 280. As the outer wing frame section 160 is pushed upward by terrain, the end of the outer wing frame section 160 pivots about the fourth pin 330 relative to the linkage bar 280, and thus, the inner wing frame section 140. Additionally, the upward movement of the outer wing frame section 160 pushes the rockshaft assembly 250 upward as well and pivots the rockshaft assembly 250 relative to the inner wing frame section 140. In particular, upward force from the outer wing frame section 160 at the first connection point on the pivot plates 260 via the second pin 310 results in the rockshaft assembly 250 pivoting about the first pin 300 extending through the first connection point on the pivot plates 260 and the first connection point on the inner wing lower mounting structure 212 of the inner wing frame section 140. During this movement, the actuator 290 is generally stationary as the rockshaft assembly 250 pivots. The slots 265 in the rockshaft assembly 250 enable movement between the rockshaft assembly 250 and the actuator 290 to an extent defined by the length of the slot. For example, as shown in FIG. 6, the outer wing frame section 160 may flex upward, pushing the rockshaft assembly 250 upward as well, until the outer ends of the slots 265 of the rockshaft assembly 250 reach the position of the fifth pin 340 and the actuator coupling member 294. As this position, the fifth pin 340, and thus actuator coupling member 294, engages the rockshaft assembly 250, thereby preventing further upward movement of the rockshaft assembly 250 and outer wing frame section 160 relative to the inner wing frame section 140. In some examples, a pneumatic pressure may be maintained within the actuator 290 in order to provide the appropriate resistance.

Generally, as described in greater detail below, the hinge assembly 200 in the working state has an instantaneous center of rotation or effective working pivot axis that is proximate to the fourth pivot point at the fourth pin 330 and is relatively low within the hinge assembly 200. This positioning enables a range of relative floating of the frame sections 140, 160 that minimizes the potential for contact between furrow openers 180, particularly in the downwardly flexed position. In one example, the hinge assembly 200 enables the outer wing frame section 160 to float approximately 10° from a horizontal limit to a downwardly flexed position and approximately 15° from a horizontal limit to an upwardly flexed position.

Figure 7:
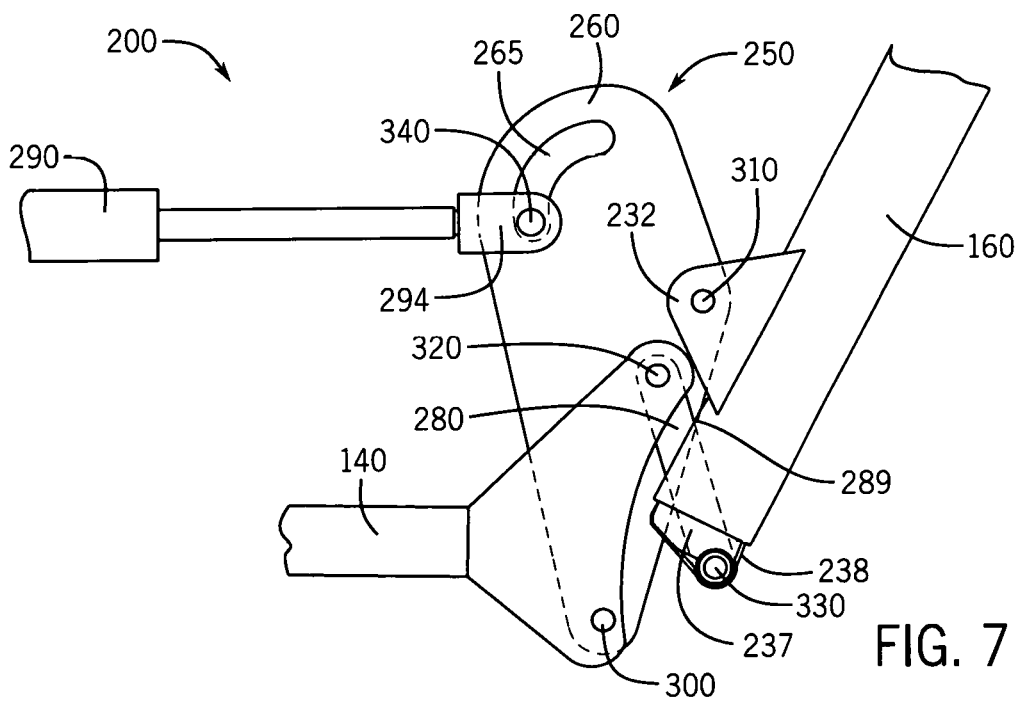
FIG. 7 is a cross-sectional side view of the hinge assembly of FIG. 2 transitioning from the working state into a folding state according to an embodiment.

Reference is further made to FIG. 7, which depicts the hinge assembly 200 transitioning from the working state into the folding state, and to FIG. 8, which depicts the hinge assembly 200 in the folding state.

In FIG. 7, the actuator 290 has been retracted relative to the positions in FIGS. 2-5 in order to initiate the folding of the frame sections 140, 160 of the hinge assembly 200. Upon initial retraction, if there is space between the fifth pin 340 and the inner ends of the slots 265 (i.e., if the outer wing frame section 160 is not being flexed downward to the maximum extent), the actuator coupling member 294 pulls the fifth pin 340 through the slots 265 such that the fifth pin 340 engages the inner ends of the slots 265 of the rockshaft assembly 250. At this point, the actuator 290 exerts a force to pull the rockshaft assembly 250 towards the inner wing frame section 140, e.g., counterclockwise in FIGS. 7 and 8. As the actuator 290 continues to retract and pull the rockshaft assembly 250, the rockshaft assembly 250 pulls the outer wing frame section 160 at the second pin 310 between the second connection point on the pivot plates 260 and the first connection point of the outer wing mounting flanges 232, thereby pulling the outer wing frame section 160 upwards. During this movement, the outer wing frame section 160 is initially pivoted about the fourth pivot point defined by the fourth pin 330 at the second connection point of members 238 of the outer wing end mounting structure 237 and the second connection point of the second end 284 of the linkage bar 280.

As the outer wing frame section 160 is pivoted upward, the end stop 289 of the outer wing frame section 160 engages the linkage bar 280 such that the outer wing frame section 160 and linkage bar 280 begin pivoting about the inner wing frame section 140, as demonstrated by a comparison of FIGS. 7 and 8. In particular, upon engagement of the end stop 289, the force of the actuator 290, via the rockshaft assembly 250 and outer wing frame section 160 at the second end 284 of the linkage bar 280, and the leverage provided by the end stop 289 operate to pivot the first end 282 of the linkage bar 280, as well as the outer wing frame section 160, about the third pivot point at the third pin 320 on the upper mounting structure 214 of the inner wing frame section 140. Subsequently, the outer wing frame section 160 and the linkage bar 280 continue to be pulled by the actuator 290 and pivot about the third pivot point at the third pin 320 until the actuator 290 stops retracting. During this movement, the pivot plates 260 of the rockshaft assembly 250 continue to pivot about the first pivot point at the first pin 300, including along the sides of the mounting structures 212, 214 of the inner wing frame section 140. In the folding state depicted in FIG. 8, the actuator 290 may retain the outer wing frame section 160. In one embodiment, the outer wing frame section 160 is pivoted at least 90° relative to horizontal, particularly approximately 155°.

During this operation, the cooperating pivot points result in an instantaneous center of rotation or effective folding pivot axis that maintains a relatively high position within the hinge assembly 200. Further, the effective folding pivot axis is higher than the effective working pivot axis, thereby reducing or eliminating any potential interference between components during the transition from the working state into the folding state.

To unfold the outer wing frame section 160 from the folding state to the working state, the rod 292 of the actuator 290 is extended. This results in the rockshaft assembly 250 and the outer wing frame section 160 rotating about the third pin 320 and reversing the movements described above.

In the context of a kinematic synthesis, the hinge assembly 200 may be considered a four-bar linkage with two fixed pivot points and two movable pivot points. In FIG. 3, the pivot points $O_A$, $O_B$, A, and B for a kinematic synthesis are labeled for the working state. For example, the fixed pivot points $O_A$ and $O_B$ may be respectively represented by pins 320 and 300, and movable pivot points A and B may be respectively represented by pins 330 and 310, thereby resulting in moving bar linkages $O_A A$, $O_B B$, and AB and stationary bar linkage $O_A O_B$. As labeled in FIG. 8 for the folding state, the pivot points $O_A$ and $O_B$ are in the same positions, and the movable pivot points A' and B' (still represented by pins 330 and 310) have been moved as the hinge assembly 200 is repositioned, thereby defining bar linkages $O_A A'$, $O_B B'$, A'B', and $O_A O_B$.

Figure 9:
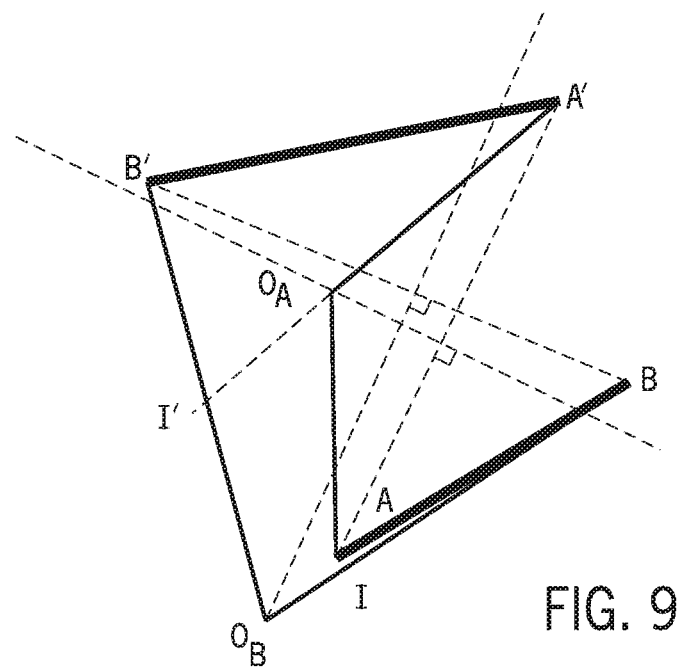
FIG. 9 is an abstracted kinematic representation of the hinge assembly of FIG. 2 according to an embodiment; and Like reference symbols in the various drawings indicate like elements.

FIG. 9 depicts an abstracted kinematic representation corresponding to the pivot points A, B, $O_A$, $O_B$, A', and B' and linkages $O_A A$, $O_B B$, AB, $O_A O_B$, $O_A A'$, $O_B B'$, and A'B' of the hinge assembly 200 of FIGS. 3 and 8 for kinematic analysis. The structure of the hinge assembly 200 is such that the corresponding pivot points A, B, A', B', $O_A$, and $O_B$ (and thus, linkages $O_A A$, $O_B B$, AB, $O_A O_B$, $O_A A'$, $O_B B'$, and A'B') are positioned and arranged to operate in an advantageous manner. For example, the hinge assembly 200 is configured such that an instantaneous center of rotation (ICR) I of linkage AB in the working state is lower than the ICR I' of linkage A'B' in the folding state. As represented in FIG. 9, the ICR I may be defined by the intersection of linkages $O_A A$ and $O_B B$, and the ICR I' may be defined by the intersection of linkages $O_A A'$ and $O_B B'$. This relationship is maintained since the fixed rotation points $O_A$ and $O_B$ are placed on perpendicular bisectors of AA' and BB', respectively. As noted above, this enables the frame sections 140, 160 to float without adjacent furrow openers 180 contacting each other and frame sections 140, 160 to be folded without interference.

Accordingly, embodiments provide a hinge assembly that functions in an advantageous manner across multiple states. Particularly, the hinge assembly enables a working state for a floating operation without adjacent tools contacting one another and a folding state without component part interference. The operations in the working and folding states, and the transitions therebetween, are possible with relatively few component parts. In one example, the hinge assembly may have just two primary components, i.e., the rockshaft assembly and the linkage bar, in cooperation with the mounting structures of the wing frame sections. As a result, embodiments described herein improve performance while reducing costs and complexity. Overall, this results in the ability to increase the size of the implement, thereby improving productivity.

Although the embodiments above are discussed with respect to an air seeder drill, other types of implements and machines may use similar hinge assemblies in which a working state and a folding state are desired. Generally, any implement with a frame having multiple frame sections may utilize the disclosed hinge assembly.

Also, the following examples are provided, which are numbered for easier reference.

1. A hinge assembly for pivotally connecting a first frame section and a second frame section of a frame, each of the first and second frame sections having a first mounting structure and a second mounting structure, the hinge assembly including: at least one pivot plate pivotally connected to the first mounting structure of the first frame section with a first pin and pivotally connected to the first mounting structure of the second frame section with a second pin, the at least one pivot plate defining a slot configured to be coupled to an actuator with a floating pin; and a linkage bar with a first end pivotally connected to the second mounting structure of the first frame section with a third pin and a second end pivotally connected to the second mounting structure of the second frame section with a fourth pin, wherein the at least one pivot plate and the linkage rod are configured such that the second frame section pivots about the fourth pin during a working state and about the third pin during a transition between the working state and a folding state.

2. The hinge assembly of example 1, wherein the fourth pin is vertically lower than the third pin when in the working state.

3. The hinge assembly of example 2, wherein the fourth pin is vertically higher than the third pin when in the folding state.

4. The hinge assembly of example 1, wherein the floating pin is configured to travel through the slot of the at least one pivot plate when the at least one pivot plate is pivoting with the second frame section during the working state, and wherein the slot has first and second ends configured to engage with the floating pin to respectively define an upwardly flexed limit and a downwardly flexed limit of the second frame section during the working state.

5. The hinge assembly of example 4, wherein the first and second ends of the slot are configured such that the upwardly flexed limit is about 15 degrees relative to horizontal.

6. The hinge assembly of example 4, wherein the first and second ends of the slot are configured such that the downwardly flexed limit is about 10 degrees relative to horizontal.

7. The hinge assembly of example 1, wherein, upon retraction of the actuator from the working state into a transition position, the actuator pulls the at least one pivot plate via the floating pin to pivot the at least one pivot plate about the first pin, and the at least one pivot plate pulls the second frame section via the second pin to initially pivot the second frame section about the fourth pin, and wherein, upon continued retraction from the transition position into the folding state, the actuator pulls the at least one pivot plate via the floating pin to continue to pivot the at least one pivot plate about the first pin, the at least one pivot plate pulls the second frame section via the second pin such that an end stop on the second frame section engages the linkage bar, and the second frame section pulls the linkage bar via the fourth pin to pivot the linkage bar and the second frame section about the third pin until the second frame section is in the folding state.

8. The hinge assembly of example 1, wherein the at least one pivot plate and the linkage bar are configured to pivot the second frame section about 155 degrees relative to horizontal between the working state and the folding state.

9. The hinge assembly of example 1, wherein a portion of the second frame section between the first and second mounting structures of the second frame section has a first center of rotation during the working state and a second center of rotation during the folding state, the first center of rotation being different than the second center of rotation.

10. The hinge assembly of example 9, wherein the second center of rotation is vertically higher than the first center of rotation during both the working state and the folding state.

11. An implement frame includes: a first frame section having a first mounting structure and a second mounting structure; a second frame section having a first mounting structure and a second mounting structure; an actuator with a first end and a second end, the first end being coupled to the first frame section; and a hinge assembly pivotally connecting the first frame section and the second frame section, the hinge assembly including: at least one pivot plate pivotally connected to the first mounting structure of the first frame section with a first pin and pivotally connected to the first mounting structure of the second frame section with a second pin, the at least one pivot plate defining a slot coupled to the second end of the actuator with a floating pin; and a linkage bar with a first end pivotally connected to the second mounting structure of the first frame section with a third pin and a second end pivotally connected to the second mounting structure of the second frame section with a fourth pin, wherein the at least one pivot plate and the linkage rod are configured such that the second frame section pivots about the fourth pin during a working state and about the third pin during a transition between the working state and a folding state.

12. The implement frame of example 11, wherein the fourth pin is vertically lower than the third pin when in the working state.

13. The implement frame of example 12, wherein the fourth pin is vertically higher than the third pin when in the folding state.

14. The implement frame of example 11, wherein the floating pin is configured to travel through the slot of the at least one pivot plate when the at least one pivot plate is pivoting with the second frame section during the working state, and wherein the slot has first and second ends configured to engage with the floating pin to respectively define an upwardly flexed limit and a downwardly flexed limit of the second frame section during the working state.

15. The implement frame of example 14, wherein the first and second ends of the slot are configured such that the upwardly flexed limit is about 15 degrees relative to horizontal.

16. The implement frame of example 14, wherein the first and second ends of the slot are configured such that the downwardly flexed limit is about 10 degrees relative to horizontal.

17. The implement frame of example 11, wherein, upon retraction of the actuator from the working state into a transition position, the actuator pulls the at least one pivot plate via the floating pin to pivot the at least one pivot plate about the first pin, and the at least one pivot plate pulls the second frame section via the second pin to initially pivot the second frame section about the fourth pin, and wherein, upon continued retraction from the transition position into the folding state, the actuator pulls the at least one pivot plate via the floating pin to continue to pivot the at least one pivot plate about the first pin, the at least one pivot plate pulls the second frame section via the second pin such that an end stop on the second frame section engages the linkage bar, and the second frame section pulls the linkage bar via the fourth pin to pivot the linkage bar and the second frame section about the third pin until the second frame section is in the folding state.

18. The implement frame of example 11, wherein the at least one pivot plate and the linkage bar are configured to pivot the second frame section about 155 degree relative to horizontal between the working state and the folding state.

19. The implement frame of example 11, wherein a portion of the second frame section between the first and second mounting structures of the second frame section has a first center of rotation during the working state and a second center of rotation during the folding state, the first center of rotation being different than the second center of rotation.

20. The implement frame of example 19, wherein the second center of rotation is vertically higher than the first center of rotation during both the working state and the folding state.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hinge assembly for pivotally connecting a first frame section and a second frame section of a frame, each of the first and second frame sections having a first mounting structure and a second mounting structure, the hinge assembly comprising:
    at least one pivot plate pivotally connected to the first mounting structure of the first frame section with a first pin and pivotally connected to the first mounting structure of the second frame section with a second pin, the at least one pivot plate defining a slot configured to be coupled to an actuator with a floating pin; and
    a linkage bar with a first end pivotally connected to the second mounting structure of the first frame section with a third pin and a second end pivotally connected to the second mounting structure of the second frame section with a fourth pin,
    wherein the at least one pivot plate and the linkage bar are configured such that the second frame section pivots about the fourth pin during a working state and about the third pin during a transition between the working state and a folding state, and
    wherein the floating pin is configured to travel through the slot of the at least one pivot plate when the at least one pivot plate is pivoting with the second frame section during the working state, and wherein the slot has first and second ends configured to engage with the floating pin to respectively define an upwardly flexed limit and a downwardly flexed limit of the second frame section during the working state.

2. The hinge assembly of claim 1, wherein the fourth pin is vertically lower than the third pin when in the working state.

3. The hinge assembly of claim 2, wherein the fourth pin is vertically higher than the third pin when in the folding state.

4. The hinge assembly of claim 1, wherein the first and second ends of the slot are configured such that the upwardly flexed limit is about 15 degrees relative to horizontal.

5. The hinge assembly of claim 1, wherein the first and second ends of the slot are configured such that the downwardly flexed limit is about 10 degrees relative to horizontal.

6. The hinge assembly of claim 1,
wherein, upon retraction of the actuator from the working state into a transition position,
the actuator pulls the at least one pivot plate via the floating pin to pivot the at least one pivot plate about the first pin, and
the at least one pivot plate pulls the second frame section via the second pin to initially pivot the second frame section about the fourth pin, and
wherein, upon continued retraction from the transition position into the folding state,
the actuator pulls the at least one pivot plate via the floating pin to continue to pivot the at least one pivot plate about the first pin,
the at least one pivot plate pulls the second frame section via the second pin such that an end stop on the second frame section engages the linkage bar, and
the second frame section pulls the linkage bar via the fourth pin to pivot the linkage bar and the second frame section about the third pin until the second frame section is in the folding state.

7. The hinge assembly of claim 1, wherein the at least one pivot plate and the linkage bar are configured to pivot the second frame section about 155 degrees relative to horizontal between the working state and the folding state.

8. The hinge assembly of claim 1, wherein a portion of the second frame section between the first and second mounting structures of the second frame section has a first center of rotation during the working state and a second center of rotation during the folding state, the first center of rotation being different than the second center of rotation.

9. The hinge assembly of claim 8, wherein the second center of rotation is vertically higher than the first center of rotation.

10. An implement frame, comprising:
a first frame section having a first mounting structure and a second mounting structure;
a second frame section having a first mounting structure and a second mounting structure;
an actuator with a first end and a second end, the first end being coupled to the first frame section; and
a hinge assembly pivotally connecting the first frame section and the second frame section, the hinge assembly comprising:
at least one pivot plate pivotally connected to the first mounting structure of the first frame section with a first pin and pivotally connected to the first mounting structure of the second frame section with a second pin, the at least one pivot plate defining a slot coupled to the second end of the actuator with a floating pin; and
a linkage bar with a first end pivotally connected to the second mounting structure of the first frame section with a third pin and a second end pivotally connected to the second mounting structure of the second frame section with a fourth pin,
wherein the at least one pivot plate and the linkage bar are configured such that the second frame section pivots about the fourth pin during a working state and about the third pin during a transition between the working state and a folding state, and
wherein the floating pin is configured to travel through the slot of the at least one pivot plate when the at least one pivot plate is pivoting with the second frame section during the working state, and wherein the slot has first and second ends configured to engage with the floating pin to respectively define an upwardly flexed limit and a downwardly flexed limit of the second frame section during the working state.

11. The implement frame of claim 10, wherein the fourth pin is vertically lower than the third pin when in the working state.

12. The implement frame of claim 11, wherein the fourth pin is vertically higher than the third pin when in the folding state.

13. The implement frame of claim 10, wherein the first and second ends of the slot are configured such that the upwardly flexed limit is about 15 degrees relative to horizontal.

14. The implement frame of claim 10, wherein the first and second ends of the slot are configured such that the downwardly flexed limit is about 10 degrees relative to horizontal.

15. The implement frame of claim 10,
wherein, upon retraction of the actuator from the working state into a transition position,
the actuator pulls the at least one pivot plate via the floating pin to pivot the at least one pivot plate about the first pin, and
the at least one pivot plate pulls the second frame section via the second pin to initially pivot the second frame section about the fourth pin, and
wherein, upon continued retraction from the transition position into the folding state,
the actuator pulls the at least one pivot plate via the floating pin to continue to pivot the at least one pivot plate about the first pin,
the at least one pivot plate pulls the second frame section via the second pin such that an end stop on the second frame section engages the linkage bar, and
the second frame section pulls the linkage bar via the fourth pin to pivot the linkage bar and the second frame section about the third pin until the second frame section is in the folding state.

16. The implement frame of claim 10, wherein the at least one pivot plate and the linkage bar are configured to pivot the second frame section about 155 degrees relative to horizontal between the working state and the folding state.

17. The implement frame of claim 10, wherein a portion of the second frame section between the first and second mounting structures of the second frame section has a first center of rotation during the working state and a second center of rotation during the folding state, the first center of rotation being different than the second center of rotation.

18. The implement frame of claim 17, wherein the second center of rotation is vertically higher than the first center of rotation.

* * * * *